(12) United States Patent
Deniz

(10) Patent No.: US 12,388,199 B1
(45) Date of Patent: Aug. 12, 2025

(54) ELECTRICAL CONDUIT CLAMP

(71) Applicant: Edel Deniz, Orlando, FL (US)

(72) Inventor: Edel Deniz, Orlando, FL (US)

(*) Notice: Subject to any disclaimer, the term of this patent is extended or adjusted under 35 U.S.C. 154(b) by 309 days.

(21) Appl. No.: 18/096,100

(22) Filed: Jan. 12, 2023

(51) Int. Cl.
*H01R 4/64* (2006.01)
*H01R 4/42* (2006.01)

(52) U.S. Cl.
CPC .............. *H01R 4/643* (2013.01); *H01R 4/42* (2013.01)

(58) Field of Classification Search
CPC .......... F16B 37/045; F16B 7/187; F16B 2/12; F16B 2/065; F16L 3/243; F16L 3/2431; F16L 3/1033; H01R 4/42; H01R 4/643
See application file for complete search history.

(56) References Cited

U.S. PATENT DOCUMENTS

| | | | | | |
|---|---|---|---|---|---|
| 2,375,513 | A * | 5/1945 | Bach | ............ | F16L 3/24 248/62 |
| 3,226,069 | A * | 12/1965 | Clarke | ............ | F16L 3/2431 24/282 |
| 3,988,052 | A * | 10/1976 | Mooney | ............ | H01R 4/46 439/814 |
| 4,044,428 | A * | 8/1977 | Kowalski | ............ | F16L 3/243 248/74.4 |
| 5,141,186 | A * | 8/1992 | Cusic | ............ | F16L 3/2431 248/68.1 |
| 5,372,341 | A * | 12/1994 | Witherbee | ............ | H02G 3/263 411/84 |
| 5,769,365 | A * | 6/1998 | Onishi | ............ | H02G 3/263 411/84 |
| 5,984,243 | A * | 11/1999 | Pfaller | ............ | F16L 55/035 248/74.1 |
| 6,106,031 | A * | 8/2000 | Guginsky | ............ | H02G 3/0683 285/379 |
| 6,494,415 | B1 * | 12/2002 | Roth | ............ | F16L 3/243 248/62 |
| 6,572,057 | B1 * | 6/2003 | Roth | ............ | F16L 3/133 248/62 |
| 6,588,711 | B2 * | 7/2003 | Onishi | ............ | F16B 37/045 248/221.11 |
| 6,643,900 | B2 * | 11/2003 | Jahrling | ............ | A47B 88/43 24/339 |
| 7,661,632 | B2 * | 2/2010 | Caveney | ............ | F16L 3/2431 248/74.2 |
| 8,662,455 | B2 * | 3/2014 | Hernandez | ............ | F16B 2/245 248/222.12 |

(Continued)

*Primary Examiner* — Patrick D Hawn
(74) *Attorney, Agent, or Firm* — Sanchelima & Associates, P.A.; Jesus Sanchelima; Christian Sanchelima

(57) ABSTRACT

An electrical conduit clamp including a support assembly, a conduit support assembly, and a conduit assembly. The support assembly includes a strut channel that is configured to be attached to a surface by means of fasteners. The strut channel has a channel along its length to receive a channel nut included in the conduit support assembly. The channel nut has a spring in a bottom portion thereof, wherein is configured to support a conduit. The pipe strut strap conforms with the shape of the conduit, thereby the conduit is held in place by means of a pipe strut trap attached to the channel nut by means of a fastener. It should be considered that another layer of the elements can be placed on top of them by attaching a plurality of strut channels to the strut channel by means of fasteners.

11 Claims, 3 Drawing Sheets

(56) References Cited

U.S. PATENT DOCUMENTS

| | | | | |
|---|---|---|---|---|
| 8,708,374 B1* | 4/2014 | Smith | | H02G 3/0683 |
| | | | | 285/154.3 |
| 8,899,544 B2* | 12/2014 | Meredith, Jr. | | H02G 3/263 |
| | | | | 248/500 |
| 9,243,723 B2* | 1/2016 | DeCesare | | F16L 3/04 |
| 9,249,994 B2* | 2/2016 | Zuritis | | H02S 20/10 |
| 9,651,171 B2* | 5/2017 | Zhang | | F16L 3/10 |
| 9,670,949 B1* | 6/2017 | White | | F16B 2/12 |
| 9,982,837 B2* | 5/2018 | Zhang | | E04B 1/1903 |
| 10,100,861 B2* | 10/2018 | Zhang | | E04B 1/5812 |
| 10,415,724 B2* | 9/2019 | Wegner | | F16B 2/04 |
| 10,451,198 B2* | 10/2019 | Lupsa | | F16B 2/065 |
| 10,707,593 B2* | 7/2020 | Wang | | H01R 4/30 |
| 10,879,681 B2* | 12/2020 | Shemtov | | H02G 3/06 |
| 11,539,198 B2* | 12/2022 | Witherbee | | H02G 3/0406 |
| 11,649,910 B2* | 5/2023 | Bendlak | | F16L 33/04 |
| | | | | 24/135 R |
| 2006/0027715 A1* | 2/2006 | Dinh | | F16L 3/227 |
| | | | | 248/65 |
| 2006/0038398 A1* | 2/2006 | Whipple | | F16L 3/1033 |
| | | | | 285/24 |
| 2010/0193645 A1* | 8/2010 | Merhar | | F16B 37/045 |
| | | | | 248/65 |
| 2012/0119037 A1* | 5/2012 | Azuma | | F16L 3/04 |
| | | | | 248/65 |
| 2012/0286110 A1* | 11/2012 | Hill | | F16L 3/26 |
| | | | | 248/74.2 |
| 2013/0047541 A1* | 2/2013 | Mayer | | E04B 9/065 |
| | | | | 52/506.05 |
| 2014/0042286 A1* | 2/2014 | Jaffari | | F24S 25/30 |
| | | | | 248/316.4 |
| 2014/0091050 A1* | 4/2014 | Zhang | | F16B 2/12 |
| | | | | 403/188 |
| 2014/0097304 A1* | 4/2014 | Mastro | | F16L 3/243 |
| | | | | 29/428 |
| 2014/0124259 A1* | 5/2014 | Dean | | H02G 3/08 |
| | | | | 174/481 |
| 2014/0197284 A1* | 7/2014 | Hikoyama | | F16L 3/243 |
| | | | | 248/74.1 |
| 2015/0276092 A1* | 10/2015 | Oliver | | C23C 28/025 |
| | | | | 248/65 |
| 2015/0316178 A1* | 11/2015 | Patil | | F16L 3/1083 |
| | | | | 29/525.08 |
| 2015/0322669 A1* | 11/2015 | Shih | | F16B 7/187 |
| | | | | 52/698 |
| 2016/0282016 A1* | 9/2016 | Ash | | F16B 1/00 |
| 2018/0187411 A1* | 7/2018 | Shang | | F16B 37/045 |
| 2018/0266729 A1* | 9/2018 | Dai | | F24S 25/65 |
| 2018/0363807 A1* | 12/2018 | Lupsa | | F16L 3/26 |
| 2020/0059075 A1* | 2/2020 | Rouleau | | H02G 3/0456 |
| 2021/0332912 A1* | 10/2021 | Rohder | | H02G 3/0456 |
| 2023/0358340 A1* | 11/2023 | Jaeger | | F16L 3/1222 |

* cited by examiner

ELECTRICAL CONDUIT CLAMP

BACKGROUND OF THE INVENTION

1. Field of the Invention

The present invention relates to clamps and, more particularly, to an electrical conduit clamp that includes a channel nut with spring placed inside a strut channel to hold in place a conduit pipe allowing to install another layer of conduits on top.

2. Description of the Related Art

Several designs for electrical conduit clamps have been designed in the past. None of them, however, include a strut channel attached onto the wall, wherein a channel nut with spring is placed inside the strut channel, thereby a strut pipe strap is attached to the channel nut with spring allowing an electric conduit to be held in place. It is also considered that another layer of the elements above mentioned can be placed on top of them, thereby saving space.

Applicant believes that a related reference corresponds to U.S. Pat. No. 3,988,052 issued for ground clamp. Applicant believes that another related reference corresponds to U.S. Pat. No. 6,106,031 issued for electrical fitting for conduit connection. None of these references, however, teach of an electrical conduit clamp having a spring-loaded flange which is used to retain the clamp in the channel of a support beam or rail.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a device to support electrical conduit to a surface.

It is another object of this invention to provide a device that is capable of putting another layer of conduit in order to save space.

It is still another object of the present invention to provide a device to support various conduit sizes according to electrical metal tubing.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
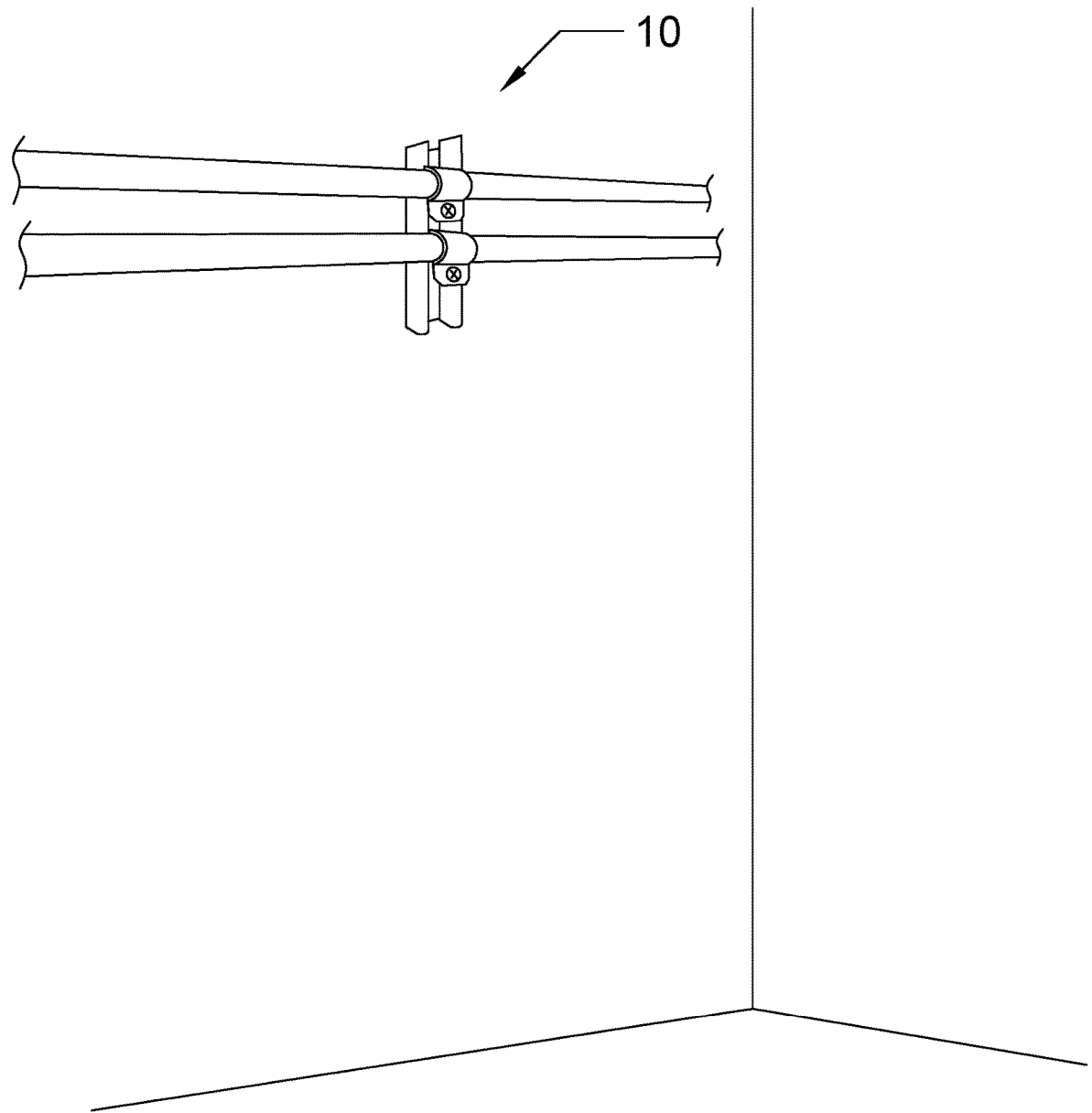
FIG. 1 represents an operational view of an exemplary embodiment of the present invention 10. The strut channel 22 is attached to a surface, the channel nut is place in a portion of the strut channel to support the conduit 62 and the strut pipe strap 64 hold in place the conduit 62, wherein a plurality of the elements herein mentioned may be placed along the strut channel 22.

Referring now to the drawings, where the present invention is generally referred to with numeral 10, it can be observed that it basically includes a support assembly 20, a conduit support assembly 40 and a conduit assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 3:
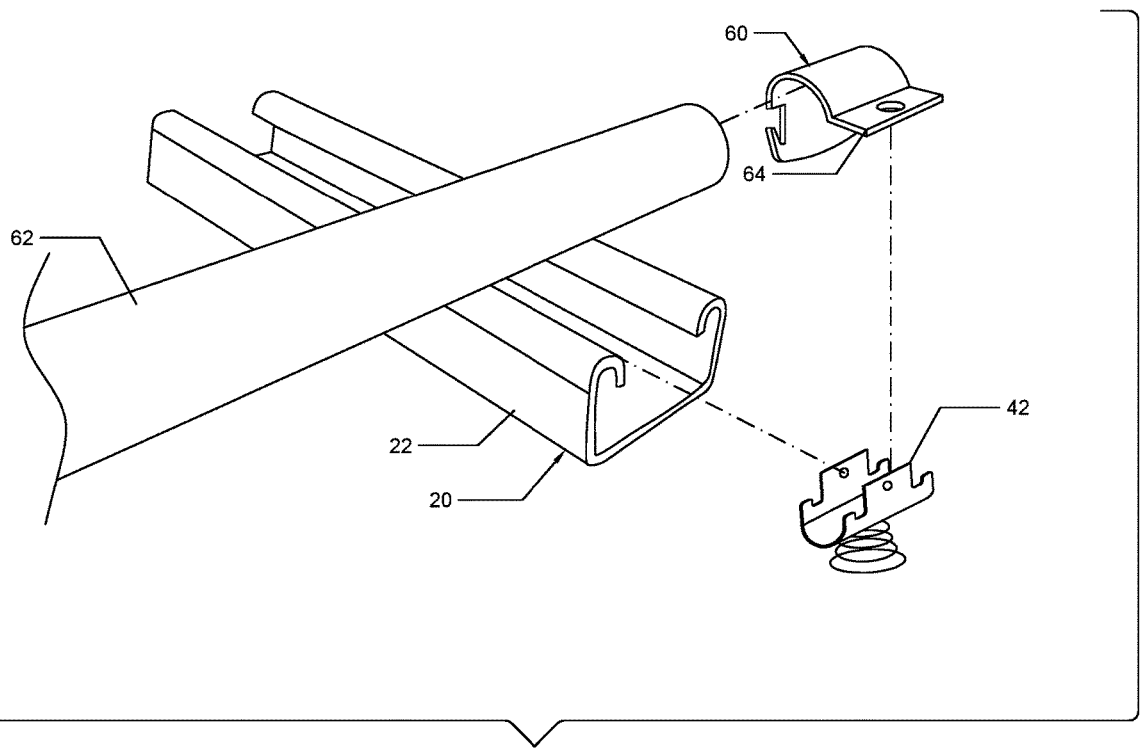
FIG. 3 illustrates an exploded view of the support assembly 20, the conduit support assembly 40, and the conduit assembly 60.

Support assembly 20 includes a strut channel 22. In an exemplary embodiment, a U-shaped strut channel 22 may be formed by means of a steel mounting rail creating an open channel, wherein the strut channel 22 may have square edges, wherein a top portion of the lateral edges of the strut channel 22 may be folded toward an internal side thereof, thereby the folded portion may be in U-shaped, creating channel edges. As best depicted in FIG. 3. In a preferred embodiment, the strut channel 22 may include slots on a bottom edge thereof, the slots may be placed along the length of the bottom edge of the strut channel. The slots may have a predetermined separation therebetween and may have a suitable shape to which a fastener passes through the shape of the slots, thereby the strut channel 22 may be attached to a surface by means of the fasteners. In a preferred embodiment, the strut channel 22 may be made of structural grade steel with a galvanized coating, nonetheless, it should be considered that the strut channel 22 may be made of any other suitable material according to the American Standards. In a suitable variation of the strut channel 22, the channel edges may have a plurality of indentations along the length of the edge thereof, thereby a channel nut 42 may be held in place by means of said plurality of indentations. It should be considered that strut channel 22 size and its variations may be based on the standards for strut channel construction.

Figure 2:
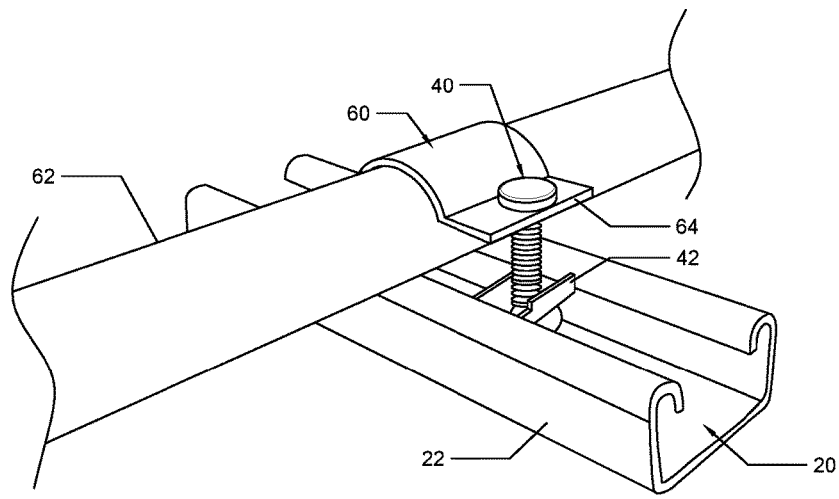
FIG. 2 shows an isometric view of the present invention 10, wherein the pipe strut strap 64 secures the conduit 62 to the channel nut 42 by means of a fastener.

Conduit support assembly 40 includes the channel nut 42. In an exemplary embodiment, the channel nut 42 may have a rectangular flat shape with lateral walls with a threaded portion on a centered area thereof, said threaded portion cross along the thickness of the channel nut 42, wherein the lateral walls may have indentations on each corner thereof, thereby the indentations with a shape that conforms with the shape of the channel edges of the channel nut 42. As best depicted in FIG. 3. The indentations of the channel nut 42 may match with the shape of the channel edges, thereby the channel nut 42 may slide along the length of the opening channel of the channel nut 42 and be secured in a perpendicular plain by means of the indentations of the channel nut 42 abutting against an internal top side of the channel edges. As FIG. 2 represents. In a preferred embodiment the length and the height of the channel nut 42 may be smaller than the opening channel area of the strut channel 22, wherein the channel nut 42 is configured to be placed into a predetermined portion along the length of the opening channel of the strut channel 22. As best illustrated in FIG. 2. In one embodiment, the channel nut 42 further includes a spring attached at a bottom side thereof, wherein said spring may have a tapered shape, being the base bigger than the top. As shown in FIG. 3. The spring takes up extra space inside the opening channel, abutting the channel nut 42 against the channel edges. As FIG. 2 illustrates. It should be considered that the channel nut 42 may have a cuboid shape, a square shape, a regular shape, an irregular shape, or any other suitable variation that permits to attach fittings to the strut channel 22.

Conduit assembly 60 includes a conduit 62 aa pipe strut straps. In an exemplary embodiment, the conduit 62 may be an electrical conduit for electrical wires, thereby the conduit 62 may be made of galvanized steel, stainless steel, or aluminum, wherein the conduit 62 may be a Rigid Metal Conduit, an Electrical Metallic Tubing, an Intermediate Metal Conduit, or a Flexible Metal Conduit. In other embodiment, the pipe strap clamp 64 may have a half-tubular shape with a flange on an edge thereof. As best depicted in FIG. 3. The circumference of the pipe strap clamp 64 may confirm with a portion of the circumference of the conduit 62. Best illustrated in FIG. 2. In a suitable embodiment, the flange of the pipe strap clamp 64 may have an opening in a portion thereof. As FIG. 3 illustrates. The opening of the flange is configured to receive a fastener, wherein said fastener passes through said opening and is fastened to the threaded portion of the channel nut 42 thereby the conduit 62 is held in place when supported by means of the pipe strap clamp 64. As FIG. 2 represents. At the opposite edge, the pipe strap clamp 64 includes a straight flange parallel to a vertical plane, wherein said straight flange has an indentation on each lateral edge thereof that conform with the shape of the channel edges. As FIG. 3 illustrates. The indentations slide along the length of the opening channel of the strut channel 22, thereby the indentations may abut against an internal top side of the channel edges to secure the pipe strap clamp 64 in a vertical plain.

Figure 4:
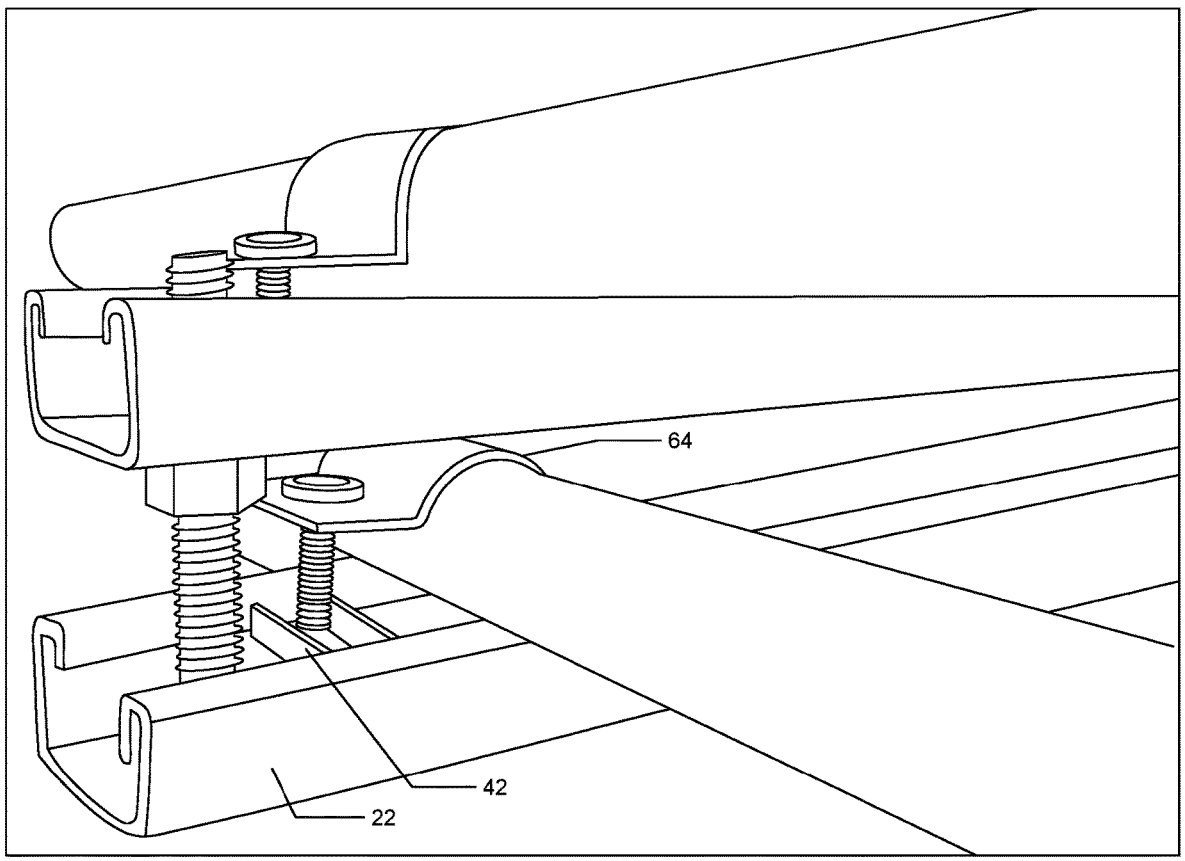
FIG. 4 is a representation of a perspective view of the present invention 10, wherein another layer of conduit 62 is placed on top thereof.

Referring to the figures of an exemplary embodiment of the present invention 10, and more particularly to FIG. 1, the strut channel 22 may be attached to a predetermined surface, wherein the conduit 62 or a plurality thereof may be perpendicularly placed on the conduit 62 and be held in placed by means of the pipe strap clamps 64 fastened to the channel nut 42 placed into the opening channel of the strut channel 22. It should be considered that another layer of conduit may be placed on top of the conduit 62, wherein a second strut channel may be placed on top of the conduit 62 and/or the pipe strap clamp 64, the second strut channel is attached to the pipe strap clamp 64 by means of a fastener attached to the bottom portion thereof, nevertheless it should be considered that the fastener may be attached to one slot of the pipe strap clamp 64 and secured by means of a hex nut, wherein the height of the second strut channel with respect to the pipe strap clamp 64 may be configured by means of a hex nut placed on a bottom portion of the second pipe strap clamp and be held in place by means of a hex nut placed on a top surface of the opening channel of the second pipe strap clamp. As best depicted in FIG. 4.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electrical conduit clamp, comprising:
   a support assembly including a strut channel, wherein said strut channel has a U-shaped frame, creating an opening channel therein, said strut channel includes a plurality of slots in a bottom portion thereof;
   a conduit support assembly having a channel nut, wherein said channel nut has a smaller length with respect to a width of said opening channel, thereby said channel nut fits into said opening channel, said channel nut has an opening in a middle portion thereof; and
   a conduit assembly including a conduit and a pipe strap clamp, wherein said conduit has a tubular shape and is configured to protect electrical wires, said pipe strap clamp has a half-tubular shape, a circumference of said pipe strap clamp conforms to a circumference of said conduit, said pipe strap clamp has a flange on an edge thereof configured to secure said conduit to said channel nut, wherein said channel nut includes a tapered-shaped coil spring on a bottommost edge thereof, said spring configured to bias said channel nut against internal edges of said U-shaped frame.

2. The electrical conduit clamp of claim 1, wherein said U-shaped frame has square bottom edges.

3. The electrical conduit clamp of claim 2, wherein said square edges have a folded portion towards an internal side of said opening channel, creating channel edges.

4. The electrical conduit clamp of claim 1, wherein a slot of the plurality of slots is configured to receive a fastener, thereby a second strut channel is capable of being placed on top of said strut channel and be held in place by means of said fastener.

5. The electrical conduit clamp of claim 4, wherein said second strut channel is configured in height with respect to said strut channel by means of a hex nut placed on a bottommost side of said second strut channel.

6. The electrical conduit clamp of claim 1, wherein said opening of said channel nut has a threaded portion, thereby said pipe strap clamp is capable of being attached to said channel nut by means of a fastener.

7. The electrical conduit clamp of claim 3, wherein said channel nut abuts against said channel edges by means of said tapered-shaped coil spring.

8. The electrical conduit clamp of claim 1, wherein said flange of said pipe strap clamp has an opening in a centered portion of an area thereof, said opening is configured to receive a fastener and attach said pipe strap clamp to said channel nut.

9. The electrical conduit clamp of claim 1, wherein said pipe strap clamp has an opposite edge with respect to said flange a straight flange parallel to a vertical plane, wherein said straight flange has an indentation on each lateral edge thereof that conform with the shape of the channel edges.

10. An electrical conduit clamp, comprising:
    a support assembly including a strut channel, wherein said strut channel has a U-shaped frame formed by a wall, creating an opening channel therein, the wall that conforms said U-shaped frame includes in a top portion a folded section towards an internal side of said opening channel, creating channel edges, said strut channel includes a plurality of slots in a bottom portion thereof;
    a conduit support assembly having a channel nut, wherein said channel nut has a smaller length with respect to a width of said opening channel, thereby said channel nut fits into said opening channel, said channel nut has an opening in a middle portion thereof, said channel nut includes a tapered-shaped coil spring, thereby the channel nut abuts against said channel edges; and a conduit assembly including a conduit and a pipe strap clamp, wherein said conduit has a tubular shape and is configured to protect electrical wires, said pipe strap clamp has a half-tubular shape, a circumference of said pipe strap clamp conforms to a circumference of said conduit, said pipe strap clamp has a flange on an edge thereof, said flange has an opening in a middle portion thereof, said pipe strap clamp further includes at an opposite edge with respect to said flange a straight flange parallel to a vertical plane, wherein said straight flange has an indentation on each lateral edge thereof that conforms with the shape of the channel edges.

11. An electrical conduit clamp, consisting of:

a support assembly including a strut channel, wherein said strut channel has a U-shaped frame formed by a wall, creating an opening channel therein, the wall that conforms said U-shaped frame includes in a top portion a folded section towards an internal side of said opening channel, creating channel edges, said strut channel includes a plurality of slots in a bottom portion thereof, a slot of the plurality of slots is configured to receive a fastener, thereby a second strut channel is capable of being placed on top of said strut channel and be held in place by means of said fastener;

a conduit support assembly having a channel nut, wherein said channel nut has a smaller length with respect to a width of said opening channel, thereby said channel nut fits into said opening channel, said channel nut has a tapered-shaped spring on a bottommost edge thereof, thereby the channel nut abuts against said channel edges, said channel nut has an opening in a middle portion thereof, wherein said opening is threaded; and a conduit assembly including a conduit and a pipe strap clamp, wherein said conduit has a tubular shape and is configured to protect electrical wires, said pipe strap clamp has a half-tubular shape, a circumference of said pipe strap clamp conforms to a circumference of said conduit, said pipe strap clamp has a flange on an edge thereof, said flange has an opening in a middle portion thereof, said pipe strap clamp further includes at an opposite edge with respect to said flange a straight flange parallel to a vertical plane, wherein said straight flange has an indentation on each lateral edge thereof that conforms with the shape of the channel edges, said pipe strap clamp is mounted on said conduit, wherein said pipe strap clamp is fastened to said channel nut by means of a fastener threaded to said opening of said channel nut and said opening of said pipe strap clamp, a plurality of conduits, a plurality of channel nuts, and a plurality of pipe strap clamps are capable of being coupled to said second strut channel, thus saving space in an electrical installation.

* * * * *